United States Patent
Mariani et al.

(10) Patent No.: US 6,897,642 B2
(45) Date of Patent: May 24, 2005

(54) MULTIPHASE BUCK TYPE VOLTAGE REGULATOR

(75) Inventors: Adalberto Mariani, Garlasco (IT); Giulio Corva, Vittuone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 82 days.

(21) Appl. No.: 10/620,310

(22) Filed: Jul. 14, 2003

(65) Prior Publication Data

US 2004/0104713 A1 Jun. 3, 2004

(30) Foreign Application Priority Data

Jul. 12, 2002 (IT) .................................... MI2002A1540

(51) Int. Cl.[7] .............................................. G05F 1/40
(52) U.S. Cl. ...................................................... 323/284
(58) Field of Search ................................. 323/280, 282, 323/283, 284; 363/62

(56) References Cited

U.S. PATENT DOCUMENTS

| | | | | |
|---|---|---|---|---|
| 5,889,392 A | * | 3/1999 | Moore et al. ............... | 323/282 |
| 5,959,441 A | * | 9/1999 | Brown ........................ | 323/282 |
| 6,362,608 B1 | * | 3/2002 | Ashburn et al. ............ | 323/272 |
| 6,462,525 B1 | * | 10/2002 | Chen .......................... | 323/285 |
| 6,661,208 B2 | * | 12/2003 | Rutter et al. ................ | 323/224 |
| 6,806,690 B2 | * | 10/2004 | Xi ............................... | 323/273 |

* cited by examiner

*Primary Examiner*—Adolf Berhane
(74) *Attorney, Agent, or Firm*—Lisa K. Jorgenson; Bryan A. Santarelli; Graybeal Jackson Haley LLP

(57) ABSTRACT

A multiphase buck type voltage regulator having at least two phases and including a first switching means that selectively connect a supply voltage to a load through a first current path; a second switching means that selectively connect said supply voltage to said load through a second current path; a first activation circuit that activates said first switching means; a first delay circuit that deactivates said first switching means after a first period of time; a second activation circuit that activates said second switching means; a second delay circuit that after a second period of time deactivates said second switching means; said first period of time depends on said supply voltage and on the output voltage; said second period of time depends on said supply voltage and on a voltage proportional to the difference of current that flows in said first and second current path.

20 Claims, 4 Drawing Sheets

MULTIPHASE BUCK TYPE VOLTAGE REGULATOR

PRIORITY

This application claims the priority of Italian Patent Application No. MI2002A001540 entitled MULTIPHASE BUCK TYPE VOLTAGE REGULATOR filed Jul. 12, 2002, which is hereby incorporated by reference for all purposes.

TECHNICAL FIELD

The present invention refers to a multiphase buck type voltage regulator.

BACKGROUND

Over recent years the considerable increase in requests for current or voltage regulators, in particular those of the buck type, has lead to the trend of placing multiple output stages in parallel. The phase shift between the modules of 360°/N, where N is the number of the modules, entails an equivalent frequency on the output filter equal to Fs*N, where Fs is the frequency of the single module. The consequence of this is a decrease of the current ripple on the output filter, with the consequent possibility of using inductances with a lower value, and therefore less resistive and with a higher saturation current, without having to physically increase the working frequency penalizing the efficiency. In addition this phase shift leads to a considerable decrease of the Rms current on the input filter, with a consequent saving of capacitance.

As a consequence of the divisions of the output stage into multiple modules, a reaction loop has to be introduced that ensures the balance of the current between the modules themselves.

The solutions that have been adopted up to now are mainly synchronous (defined as voltage mode or current mode), as the phase shift between the modules can be easily obtained through the phase shift of the synchronization circuits.

Nevertheless, for several applications completely asynchronous reaction loops (defined as hysteretic in voltage, hysteretic in current, constant Ton, constant Toff) are preferable, but they can present problems with duty cycles exceeding 50%.

SUMMARY

In view of the state of the technique described, an embodiment of the present invention provides an asynchronous multiphase buck type voltage regulator that does not have the problems of the known art.

This embodiment is achieved by means of a buck type voltage regulator with at least two phases comprising first switching means that selectively connect a supply voltage to a load through a first current path; second switching means that selectively connect said supply voltage to said load through a second current path; a first activation circuit that activates said first switching means; a first delay circuit that deactivates said first switching means after a first period of time; a second activation circuit that activates said second switching means; a second delay circuit that after a second period of time deactivates said second switching means; said first period of time depends on said supply voltage and on the output voltage; said second period of time depends on said supply voltage and on a voltage that is proportional to the difference of currents that flow in said first and second current paths.

BRIEF DESCRIPTION OF THE DRAWINGS

The characteristics and advantages of the present invention will appear evident from the following detailed description of an embodiment thereof, illustrated as a non-limiting example in the enclosed drawings, in which.

DETAILED DESCRIPTION

In the case of reaction loops at constant Ton, the regulation of the output voltage comes about through a comparator placed on the output terminal. When the output voltage goes down below a voltage reference, the comparator changes and positions the state of a flip flop at logic 1. After a time Ton the flip flop is reset. The state of the flip flop commands the high output transistor to turn on and the low output transistor to turn off, and vice versa.

This type of control is restricted by a single request of stability on the output filter, or rather the constant of time of the output filter must be greater than the switching time of the voltage regulator. This condition implies that the ripple on the output voltage is the triangular resistive type.

In the stationary state, the turning on of the power transistors comes about with a constant period equal to T=Ton (Vin/Vout), where Vin is the input voltage and Vout is the output voltage. This relation suggests a way to guarantee a working frequency that is almost constant in the stationary state, that is it is sufficient to use a timer that imposes a time Ton=Tsw (Vout/Vin), where Tsw is the switching time. This solution is commonly called constant Ton with feedforward.

Figure 1:
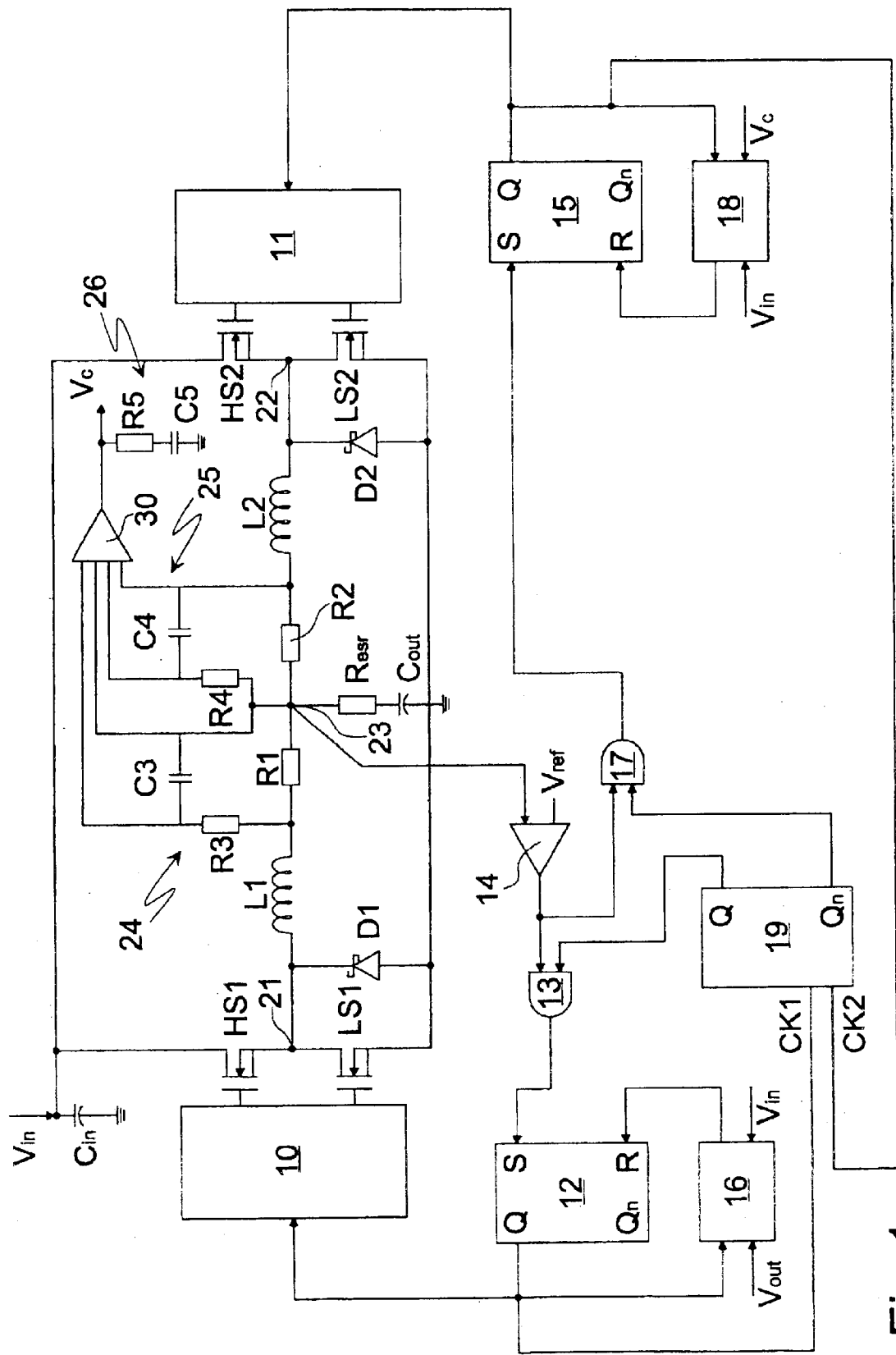
FIG. 1 shows a block diagram of a multiphase buck type voltage regulator with a reaction loop at constant Ton with bistable, in accordance with an embodiment of the present invention.

We now refer to FIG. 1 that shows a block diagram of a multiphase buck type voltage regulator with a reaction loop at constant Ton with bistable, in accordance with an embodiment of the present invention.

A first driving stage 10 drives two transistors HS1 and LS1, the transistor HS1 is connected between a supply voltage Vin and a first central terminal 21 between the transistors HS1 and LS1. The transistor LS1, and a zener diode D1, are connected between the first central terminal 21 and ground. An inductance L1 is connected between the first central terminal 21 and a resistance R1 in turn is connected to the output terminal 23 where the output voltage Vout is present.

A second driving stage 11 drives two transistors HS2 and LS2, the transistor HS2 is connected between a supply voltage Vin and a second central terminal 22 between the transistors HS2 and LS2. The transistor LS2, and a zener diode D2, are connected between the second central terminal 22 and ground. An inductance L2 is connected between the second central terminal 22 and a resistance R2 in turn is connected to the output terminal 23 where the output voltage Vout is present.

Between the output terminal 23 and ground a resistance Resr and a capacitor Cout are connected in series.

The voltage across the resistance R1 is applied to a first low-pass filter 24 composed of the resistance R3 and the capacitor C3. The output of the first filter 24 is applied to a differential current integrator that produces a voltage VC at its output. The voltage VC is filtered by a filter 26 made up of a resistance R5 and a capacitor C5, positioned in series between each other and connected between the voltage VC and ground. The voltage across the resistance R2 is applied to a second low-pass filter 25 composed of the resistance R4 and the capacitor C4. The output of the second filter 25 is also applied to the differential current integrator 30.

The output voltage Vout is withdrawn and applied to an input of a comparator 14, a reference voltage Vref is applied to the other input of the comparator 14.

The output of the comparator 14 is applied to an input of an AND circuit 13 and to an input of an AND circuit 17. The output of the AND circuit 13 is applied to the S input of a flip flop (of the SR type) 12. The Q output of the flip flop 12 is connected to the input of the first driving stage 10, to an input of a first delay circuit 16 and to a first input Ck1 of a flip flop (of the modified toggle type) 19. The first delay circuit 16 also receives the voltages Vout and Vin, and its output is connected to the R input of the flip flop 12.

The output of the AND circuit 17 is applied to the S input of a flip flop (of the SR type) 15. The Q output of the flip flop 15 is connected to the input of the second driving stage 11, to an input of a second delay circuit 18 and to a second input Ck2 of a flip flop (of the toggle type) 19. The second delay circuit 18 also receives the voltages Vout and Vc, and its output is connected to the R input of the flip flop 15.

The Q output of the flip flop 19 is applied to an input of the AND circuit 13. The Qn output of the flip flop 19 is applied to an input of the AND circuit 17.

The flip flop 19 has been described as having two clock inputs Ck1 and Ck2. This means that the flip flop changes state upon arrival of one or the other signal applied at the inputs Ck1 and Ck2.

Figure 4:
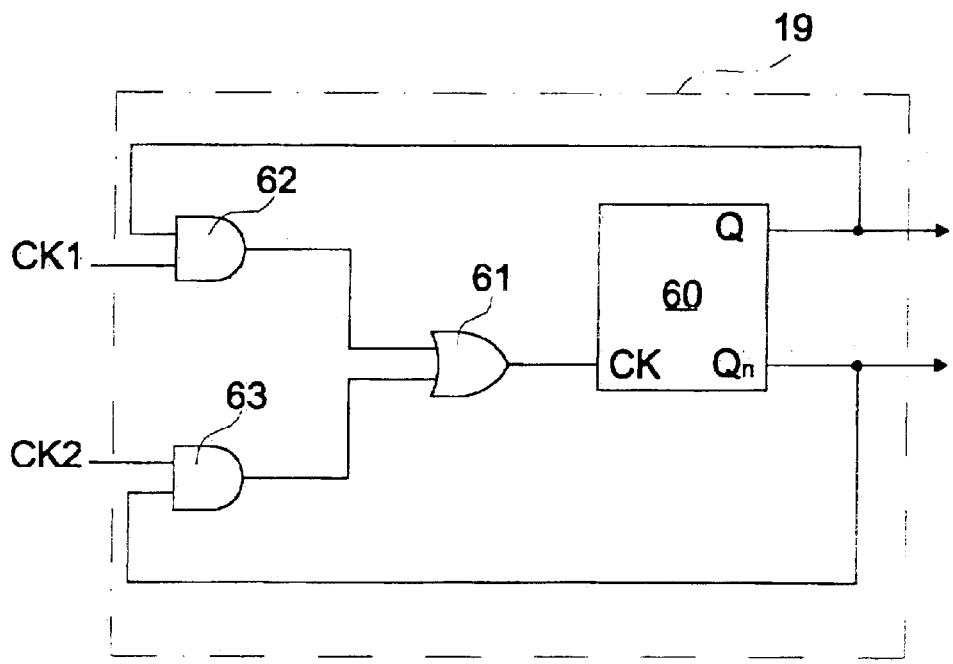
FIG. 4 shows a block diagram of a flip flop circuit used in FIG. 1, in accordance with an embodiment of the invention.

One possible implementation of the flip flop (of the modified toggle type) 19 can be like that in FIG. 4. It comprises a flip flop of the toggle type 60 having a single clock input Ck. The clock input Ck1 is applied to an input of an AND circuit 62, whose output is applied to an input of an OR circuit 61. The output of the OR circuit 61 is applied to the clock input CK of the flip flop 60.

The clock input Ck2 is applied to an input of an AND circuit 63, whose output is applied to another input of the OR circuit 61. The Q output of the flip flop 60 is applied to the other input of the AND circuit 62. The Qn output of the flip flop 60 is applied to the other input of the AND circuit 63.

Referring again to FIG. 1, let us presume for the moment that the voltage Vout and not the voltage Vc is in input to the second delay circuit 18.

A phase shift of 180° is guaranteed by the fact of using the same comparator on the output to determine the moment both phases are turned on. This functions only if the duty cycle is less than 50%. In this case, in the stable state, when the output becomes less than the reference voltage Vref, the output of the comparator 14 changes to logic 1, the high transistor (HS1) turns on, and it is capable on its own of bringing back the output above the reference voltage Vref, and making the comparator 14 change again. With the flip flop 19 it is possible to carry out the change between the phases after which the comparator 14 is returned to zero. At this point the successive turn-on comes about on the other phase with a phase shift of 180°. The final result is a phase shift in the stable state, very similar to that which would occur with a synchronous control loop. During the transients, this behavior does not occur and moreover as well as the temporary increase of the frequency typical of the controls at constant Ton, a synchronization of the phases can occur.

For duty cycles exceeding 50%, the turning on of the high transistor of a single phase does not permit the output to rise higher than the voltage reference Vref. At this point the output goes down below the reference voltage Vref, the output of the comparator 14 changes to logic 1, and as only one high transistor is on, it is not capable of bringing back the output Vout above the reference Vref. Therefore, as soon as the phase change takes place (flip flop 19) the second high transistor HS2 is also turned on, with consequent synchronization of the phases.

This concept can be extended for regulators with N phases. In this case, instead of a flip flop like that of the toggle type 19, a module counter N and a cascade decoder are used to turn on in sequence a high transistor at every change of the comparator 14. The limitation on the maximum duty cycle to have symmetrical phase becomes 100%/N.

Figure 2:
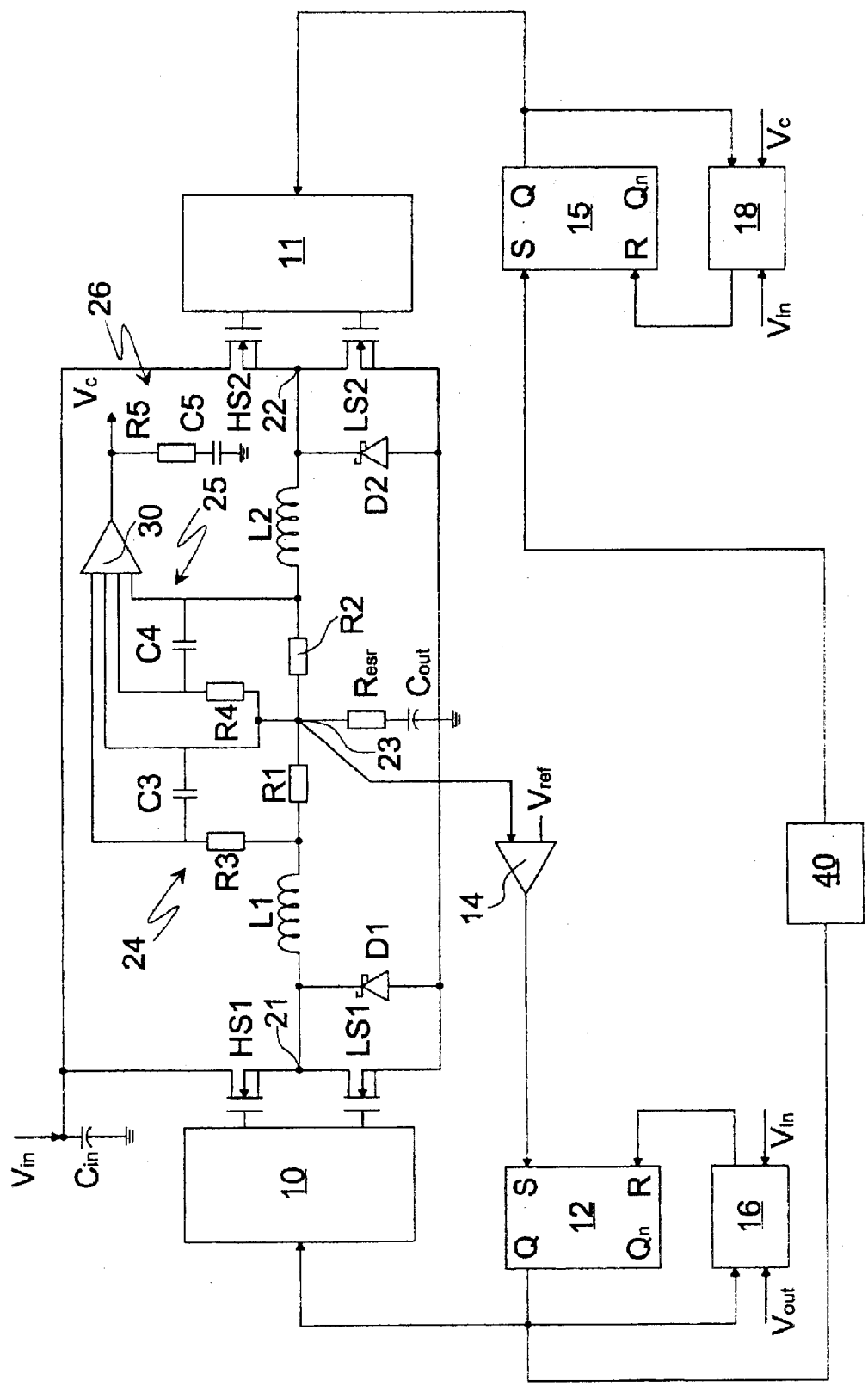
FIG. 2 shows a block diagram of a multiphase buck type voltage regulator with a reaction loop at constant Ton by means of a timer, in accordance with an embodiment of the present invention.

An alternative method for obtaining a phase shift of about 180° is that shown in FIG. 2, that represents a block diagram of a multiphase buck type voltage regulator with a reaction loop at constant Ton by means of a timer, in accordance with an embodiment of the present invention.

The devices similar to those in FIG. 1 have the same numerical references. In regard to FIG. 1, the AND circuits 13 and 17 and the flip flop 19 are not present in FIG. 2. The comparator 14 is connected directly to the S input of the flip flop 12. The Q output of the flip flop 12 is connected to a delay circuit 40 whose output is connected to the S input of the flip flop 15. The delay circuit 40 introduces a delay equal to Tsw/2.

When the output Vout goes down below the reference voltage Vref, the comparator 14 changes to logic 1 and the high transistor HS1 turns on. The turning on of the other high transistor HS2 comes about after a delay set by that of the first one, determined by the delay circuit 40, calculated so as to have a phase shift of 180° in the stable state.

Each of the two phases has Ton=Tsw (Vout/Vin). The delay between the two modules, to have the second module turn on after 180°, equals Td=Tsw/2.

With a duty cycle lower than 50% the system is stable, as the second module turning on ensures that the output rises above the reference, and thus makes the comparator 14 change state before the control returns to the first module.

When the duty cycle comes close to 50%, the turning on of the second module may be insufficient to make the comparator 14 change state again to zero, and there is an immediate turning on of the first module as well, with consequent potential instability of the system.

Also in this case for duty cycles exceeding 50%, the turning on of only one high transistor does not bring the output Vout back above the reference voltage Vref.

To extend this solution to regulators with N phases, it is contrived that the first module turns on in correspondence with the change of the comparator 14, and the successive modules turn on consequently with growing delays given by the following relation Tdx=(Tsw*(x−1))/N where x is the index of the module.

The output ripple is substantially annulled for duty cycles equal to 100%/N.

In the two examples described, and in the case where the voltage Vout and not the voltage Vc is input to the second delay circuit 18, at the most, a duty cycle equal to 100%/N is obtained.

It has been discovered that the performances can be improved by modulating the Ton, transferring energy from one inductance to the other varying the Ton of one in relation to the other.

Considering the difference of current I between the two inductances L1 and L2, Vin the input voltage, L the value of the inductances (averaged), Rp the average value of the resistance of the current path between Vin and Vout, d the variation of the duty cycle of small signal and equal to d=ton/Tsw, where ton is the variation of small signal of the turning on time, one has I=(d*Vin)/(sL+Rp). Combining the two last relations you obtain I=(ton*Vin)/tsw*(sL+Rp). At this point to balance the currents between the two modules, a module has a Ton equal to Ton=Tsw (Vout/Vin), and the other adapts its own Ton so as to balance the currents. That is as shown in FIGS. 1 and 2 where the first delay circuit 16 receives Vout and the second delay circuit 18 receives Vc.

In this manner one obtains ton=Tsw*(Vc/Vin) and I=Vc*(1/(sL+Rp)).

Figure 3:
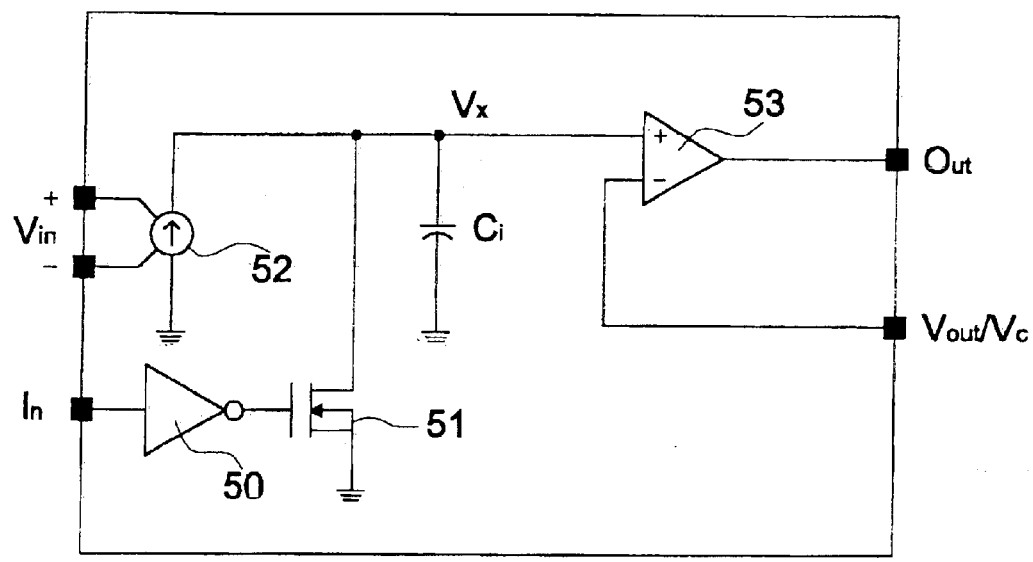
FIG. 3 shows a block diagram of a delay circuit used in FIGS. 1 and 2, in accordance with an embodiment of the invention.

FIG. 3 shows a block diagram of a delay circuits (16, 18) used in FIGS. 1 and 2, in accordance with an embodiment of the invention.

The input In, to which the Q output of the flip flop 12 and the Q output of the flip flop 15 is applied, is applied to an inverting circuit 50, whose output is applied to the gate of a transistor 51 having its source at ground and its drain connected to a voltage Vx. The input voltage is applied to the terminal Vin+ while the terminal Vin− is to be applied to ground. The input voltage Vin is applied to a current generator 52 I=K Vin. This generator 52 is applied to the non-inverting input of a comparator 53, whose output Out is connected to the R inputs of the flip flops 12 and 15. A capacitor Ci is applied between the generator 52 and ground. The delay circuit also receives the voltage Vout at the terminal Vout/Vc in the case of the first delay circuit 16, and the voltage VC in the case of the second delay circuit 18.

Starting from the arrival of the signal at the terminal In, the capacitor Cl starts charging by means of the current of the generator 52, and the voltage Vx increases until it reaches the voltage present at the terminal Vout/Vc, at this point the comparator 53 switches its output.

The previous relation of I, in the case of input voltage Vc, presents a pole at frequency p1=1/(2πL/Rp), which is typically found in the frequency interval of between 1 and 10 KHz. Taking into account that the cutoff frequency of the control circuit is typically between 10 and 30 KHz, it is a consequence that the DC gain of the system varies between 3 and 10. These values are typically too low to have an acceptable control. To annul the regulation error in DC due to the loop gain, it is advisable to introduce an integration of the difference of the currents in the system. An integrator introduces a further phase shift of 90°, which summed to that of the pole p1 makes the loop unstable. Thus, to preserve stability, one typically introduces a zero.

For example FIGS. 1 and 2 show the circuit relating to the differential current integrator 30 with the low-pass filters 24 and 25 composed respectively of the resistances R3 and R4 and of the capacitors C3 and C4 that resolve the above problem. The filters 24 and 25 each have cutoffs at a frequency exceeding zero, as they have been introduced to filter both the current ripple and any eventual noise.

An alternative method for eliminating the current ripple, if the phase shift between the two modules is equal to about 180°, can be to sample the current of a module in correspondence with the turning on of the high transistor of the other module. In this case as filters 24 and 25 are not necessary, the compensation of the system can be helped with a higher band.

To extend the solution, where the first delay circuit 16 receives Vout and the second delay circuit 18 receives Vc, to N phase regulators, the first module (defined as master) has a delay circuit that receives Vout, and imposes the Tsw. The other modules adapt their own Ton so as to equal their own current like the first module. Each of the other modules has a delay circuit that receives the voltage VC generated by a differential current integrator 30 that integrates the difference of current between the module master and the module itself.

Figure 5:
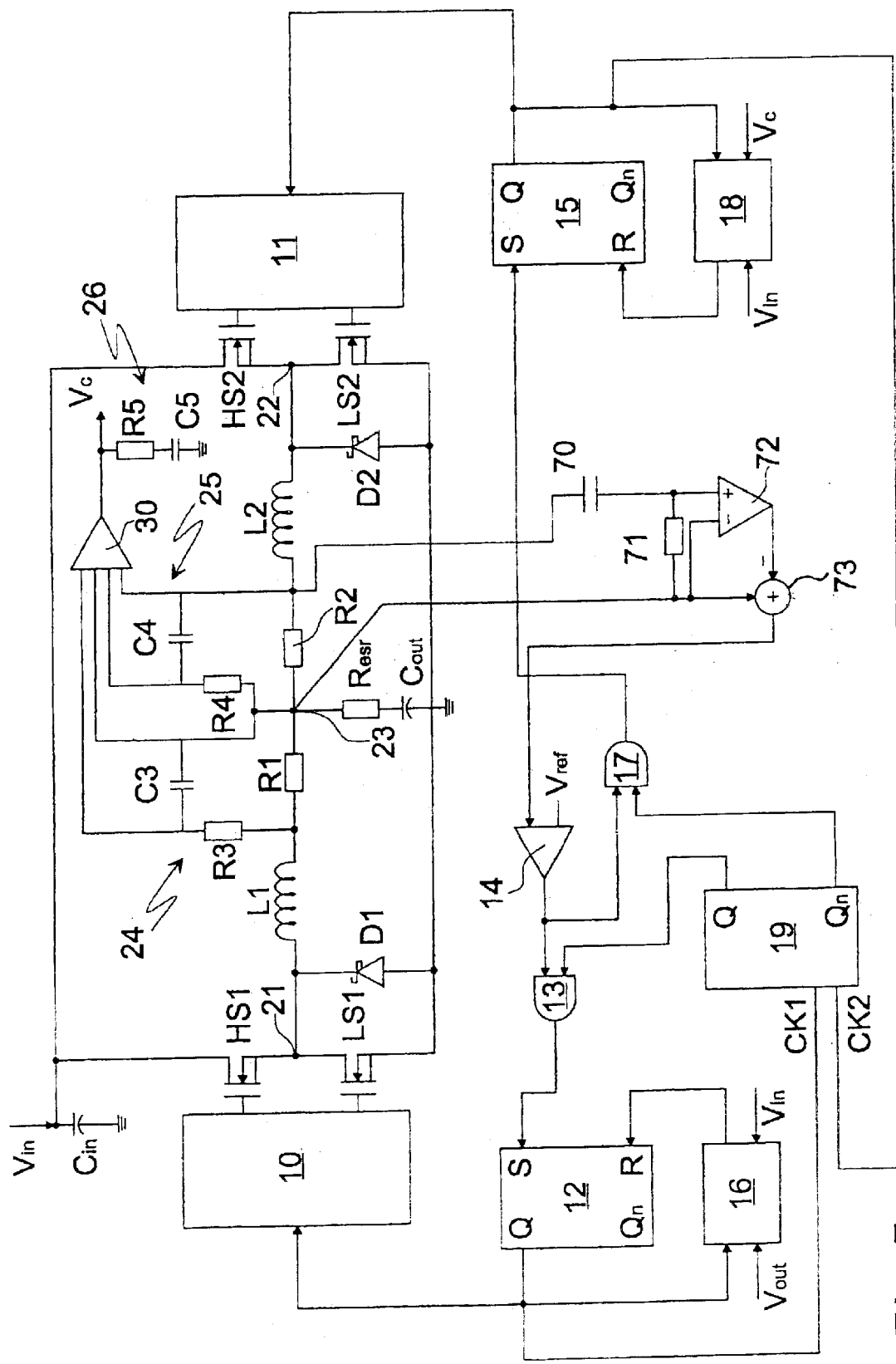
FIG. 5 shows a variation of a block diagram of a multiphase buck type voltage regulator with a reaction loop at constant Ton with bistable of FIG. 1, in accordance with an embodiment of the invention.

In FIG. 5 is shown a variation, of a block diagram of a multiphase buck type voltage regulator with a reaction loop at constant Ton with bistable, of FIG. 1, in accordance with an embodiment of the invention. In this case the duty cycles can exceed 50% without problems.

The signal available across the resistance R2 is provided to a high pass filter constituted by the capacitor 70 and the resistor 71, then is applied to a non-inverting input of a comparator 72. The capacitor 70 is connected between the non-inverting input of a comparator 72 and the connection point of the resistance R2 and the inductance L2. The inverting input of the comparator 72 is connected to the output terminal 23. The resistance 71 is connected between the inverting input and the non-inverting input of the comparator 72. The output of the comparator 72 is connected to an input of an algebraic adder 73, the output terminal 23 is connected to another input of the adder 73. The signal at the output of the adder 73 is the difference between the signal at the output terminal 23 and the signal at the output of the comparator 72.

The signal at the output of the adder 73 is connected to the input of the comparator 14, a reference voltage Vref is applied to the other input of the comparator 14.

The high pass filter cuts the direct component of the signal at the terminals of the resistance R2. The voltage at the input of the comparator 72 is VR2=R2*Irms2, where Irms2 is the RMS current of the inductance L2.

The comparator 72 has an amplification factor equal to Resr/R2, so to have at its output a signal equal to V'=(Resr*VR2)/R2.

The voltage V" at the output of the adder 73 is V"=Vout−V'=Vout−Resr*Irms2.

In this way, the voltage V" represents Vout minus the RMS voltage of the second stage.

At the input of the comparator 72 is applied a signal equal to the output voltage of a single output stage in a mono phase configuration, because the contribution of the second stage is balanced. In this way, when the voltage on inductance L2 goes beyond the reference, the comparator changes and turns on the high side transistor HS2 bringing the voltage on inductance L2 over the reference Vref itself. The phase shift of 180° is obtained by the timer between the two stages.

Each of the converters of FIGS. 1, 2, and 5 can be disposed on one or more integrated circuits (ICs), and such one or more ICs can be incorporated into an electronic system.

From the foregoing it will be appreciated that, although specific embodiments of the invention have been described herein for purposes of illustration, various modifications may be made without deviating from the spirit and scope of the invention.

What is claimed is:

1. Buck type voltage regulator with at least two phases comprising:
   first switching means that selectively connect a supply voltage to a load through a first current path;
   second switching means that selectively connect said supply voltage to said load through a second current path;
   a first activation circuit that activates said first switching means;
   a first delay circuit that deactivates said first switching means after a first period of time;
   a second activation circuit that activates said second switching means; and
   a second delay circuit that after a second period of time deactivates said second switching means,
   said first period of time depends on said supply voltage and on the output voltage;
   said second period of time depends on said supply voltage and on a voltage proportional to the difference of current that flows in said first and second current path.

2. Voltage regulator in accordance with claim 1 wherein said first activation circuit and said second activation circuit activate said first switching means and said second switching means in response to a decrease of the output voltage; said second switching means being activated after the activation of said first switching means.

3. Voltage regulator in accordance with claim 1 wherein said current that flows in said first and second current path is filtered by a low-pass filter and integrated by a differential integrator in current.

4. Voltage regulator in accordance with claim 2 wherein said first activation circuit receives a signal from a comparator that compares said output voltage with a preset reference voltage.

5. Voltage regulator in accordance with claim 1 wherein first delay circuit comprises a current generator that loads a capacitor until the voltage at the ends of said capacitor reaches said output voltage.

6. Voltage regulator in accordance with claim 5 wherein said current generator supplies a current proportional to said supply voltage.

7. Voltage regulator in accordance with claim 1 wherein said second delay circuit comprises a current generator that loads a capacitor until the voltage at the ends of said capacitor reaches said voltage proportional to the difference of current that flows in said first and second current path.

8. Voltage regulator in accordance with claim 1 wherein said first activation circuit activates said first switching means in response to a decrease of the output voltage; said second switching means are activated after the activation of said first switching means.

9. Voltage regulator in accordance with claim 7 wherein said second switching means are activated after preset time equal to Tsw/2.

10. Voltage regulator in accordance with claim 2 wherein it comprises a bistable circuit which after the activation of one of said first and second activation circuits enables the other of said first and second activation circuits.

11. Voltage regulator in accordance with claim 1 wherein said first period of time is directly proportional to said supply voltage and inversely proportional to said output voltage.

12. Voltage regulator in accordance with claim 1 wherein said second period of time is directly proportional to said supply and inversely proportional to inversely proportional to said voltage proportional to the difference of current that flows in said first and second current path.

13. Voltage regulator in accordance with claim 2 wherein said first activation circuit receives a signal from a comparator that compares a signal equal to said output voltage minus the RMS voltage of one stage with a preset reference voltage.

14. An electronic system, comprising:
   a load;
   a first switching circuit that selectively connects a supply voltage to the load through a first current path;
   a second switching circuit that selectively connects the supply voltage to the load through a second current path;
   a first activation circuit that activates the first switching circuit;
   a first delay circuit that deactivates the first switching circuit after a first period of time;
   a second activation circuit that activates the second switching circuit;
   a second delay circuit that after a second period of time deactivates the second switching circuit;
      wherein the first period of time depends on the supply voltage and a voltage across the load; and
      said second period of time depends on said supply voltage and on a voltage proportional to a difference between the currents that respectively flow through the first and second current paths.

15. A method, comprising:
   driving a current through a load via a first path for a first period of time that depends on first and second voltages; and
   driving the current through the load via a second path for a second period of time that depends on the first voltage and on currents that respectively flow through the first and second paths.

16. The method of claim 15 wherein:
   driving the current through the load via the first path comprises coupling the first voltage to the load via the first path for the first period of time; and
   driving the current through the load via the second path comprises coupling the first voltage to the load via the second path for the second period of time.

17. The method of claim 15 wherein the first voltage comprises a supply voltage.

18. The method of claim 15 wherein the second voltage comprises a voltage across the load.

19. The method of claim 15, further comprising:
   determining a difference between the currents that respectively flow through the first and second paths; and
   determining the second period of time based on the difference between the currents.

20. The method of claim 15 wherein:
   driving the current through the load via the first path comprises,
      coupling the first voltage to the first path, and
      uncoupling the first voltage from the first path after the first period of time has elapsed; and
   driving the current through the load via the second path comprises,
      coupling the first voltage to the load via the second path, and
      uncoupling the first voltage from the second path after the second period of time has elapsed.

* * * * *